United States Patent [19]

Fontein et al.

[11] 4,034,861

[45] July 12, 1977

[54] PROCESS AND INSTALLATION FOR RECOVERING USABLE MATERIALS FROM WASTE MATERIAL CONTAINING METALS AND NON METALS

[75] Inventors: Freerk J. Fontein, Margraten; Hubert H. Dreissen, Geleen, both of Netherlands

[73] Assignee: Stamicarbon B.V., Geleen, Netherlands

[21] Appl. No.: 640,209

[22] Filed: Dec. 12, 1975

[30] Foreign Application Priority Data

Dec. 12, 1974 Netherlands .................... 7416164

[51] Int. Cl.² ........................................ B03B 5/34
[52] U.S. Cl. ................................. 209/10; 241/24; 241/DIG. 38; 209/211
[58] Field of Search ............. 241/3, 20, 21, 24, 29, 241/79.1; 209/211, 10

[56] References Cited

U.S. PATENT DOCUMENTS

| | | | |
|---|---|---|---|
| 2,793,748 | 5/1957 | Herkenhoff | 209/211 |
| 3,306,671 | 2/1967 | Leeman | 209/241 |
| 3,379,308 | 4/1968 | Horiuchi | 209/211 |
| 3,582,001 | 1/1971 | Rose | 241/3 |
| 3,603,514 | 9/1971 | Williams | 241/79.1 |
| 3,687,286 | 8/1972 | Weiss | 209/211 |
| 3,735,869 | 5/1973 | Carpenter et al. | 209/211 |
| 3,887,456 | 6/1975 | Loughner | 209/211 |
| 3,897,215 | 7/1975 | Davidson, Jr. et al. | 241/79.1 |

FOREIGN PATENT DOCUMENTS

893,485  4/1962  United Kingdom .............. 241/79.1

*Primary Examiner*—Granville Y. Custer, Jr.
*Attorney, Agent, or Firm*—Cushman, Darby & Cushman

[57] ABSTRACT

A process and apparatus for recovering useable materials from discarded scrap material, such as junked automobiles, is disclosed in which non-ferrous metals are separated from non-metals in a hydrocyclone using water as the aqueous separating medium. A particulate scrap/water suspension is injected into the cylindrical area of the hydrocyclone and a predominently non-metal-containing portion is removed from an overflow area of the cyclone while the non-ferrous metal containing portion is removed from the apex area of the cyclone. If required, the scrap material is preferably pulverized prior to treatment and is subjected to a ferrometallic separation operation if such metals are present.

8 Claims, 1 Drawing Figure

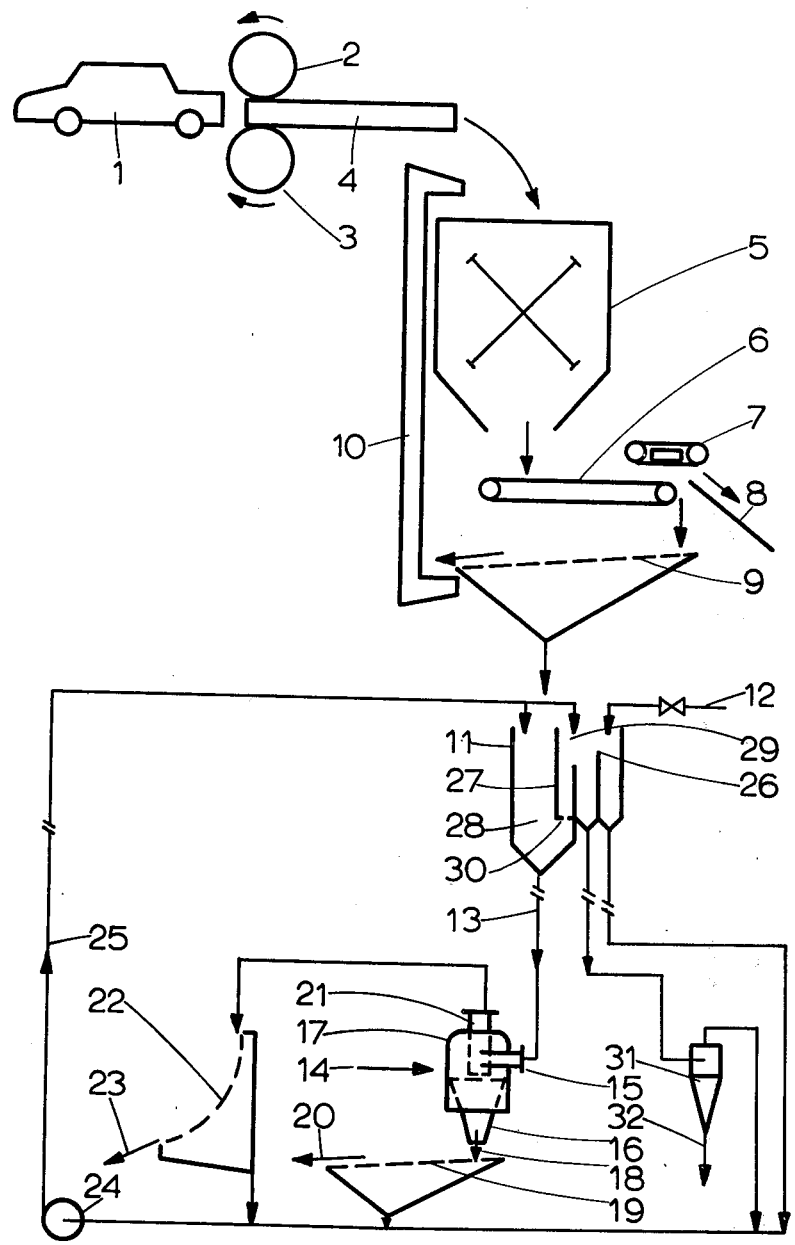

PROCESS AND INSTALLATION FOR RECOVERING USABLE MATERIALS FROM WASTE MATERIAL CONTAINING METALS AND NON METALS

BACKGROUND OF THE INVENTION

The present invention relates to a process for recovering useable materials from scrap refuse, comprising metals and non-metals, particularly as produced in the scrapping of used automobiles. Usually scrap articles are reduced in size by grinding or shredding and the ferromagnetic components of the scrap material are recovered. The non-ferrous portion of the scrap (comprising non-ferrous metals and non-metals), is separated from the shredded scrap according to the relative specific gravity of the components using an aqueous separating medium. The aqueous separating medium is mixed with the scrap and a first fraction is removed which consists primarily of non-ferrous metals and a second fraction is removed consisting primarily of non-metals, such as rubber, plastics and textile materials commonly used in automobiles. Though this process is particularly adapted to the treatment of scraped automobiles, it is also useful in other types of scrap material including domestic appliances and optionally other household waste materials.

A method for recovering metals contained in discarded cables and cablewaste has been described in German Auslegeschrift No. 1,263,641. According to the procedure there described, the material is ground and subjected to magnetic separation to remove ferrous-containing components. The non-magnetic fraction is separated according to its specific gravity in a float-and-sink apparatus. In this apparatus, the light fraction, primarily the insulation material, is separated from the heavier fraction which contains the non-ferrous metals such as copper, aluminum and lead. The separating medium used is a suspension having a specific gravity of about 2.0. Such a procedure could be adapted for treating the scrap from waste automobiles and similar materials, however, especially in the case of automobiles and other such waste products, it is necessary to precede the float-and-sink treatment by a procedure in which the non-desirable materials, sometimes referred to as "dirt", such as textile remnants, paper or foam rubber and the like, are removed by a separate separating step using a current of running water. The main reason is that such materials have a high absorption capacity for the separating suspension which would lead to loss of the suspension. Such a method is also limited by the fact that it is not particularly suitable for separating particles smaller than about 6 millimeters which occur in virtually every waste material which is separated to remove the valuable components contained therein. In addition to the necessary requirements of the starting scrap material, the recovery of the heavy portion of the scrap and the maintenance of the correct specific gravity of the suspension necessarily requires the use of expensive equipment.

A procedure has now been found in which metals and non-metals may be selectively separated from shredded scrap in a simpler and more direct process than has been previously described. More particularly, the present process does not require a pre-treatment for removal of non-metal parts (dirt) in a water current, is capable of separating particles smaller than 6 millimeters and does not require the use of a high specific gravity separating medium, thereby avoiding the attendant difficulties of using such a medium and expensive equipment therefore.

A characterizing feature of the invention is the use of equipment which is, in itself, already known and wherein the separation of the metals from the non-metals is accomplished according to the various specific gravities of each by means of at least one hydrocyclone. Water is used as a separating medium and, when mixed with shredded scrap, the resulting suspension is separated into a first fraction which is discharged, together with a certain amount of water, at the cyclone apex. A second fraction is discharged, also together with the attendant water, at the cyclone overflow area. Both of the two separated fractions are de-watered and the components recovered therefrom.

An important advantage of such a procedure, as described herein, when using the hydrocyclone and water is that the otherwise extra step of removing textile materials and other non-metals is obviated.

According to the procedure of the invention, by separating the various fractions of the scrap suspension in a hydrocyclone, the specific gravity of the separation achieved may be considerably larger than the specific gravity of the separating medium itself depending, of course, on the dimensions of the cyclone and on the operating conditions therein, so that the use of a heavy medium (that is, having a high specific gravity) and its inherent drawbacks is avoided. It has been found that the presence of particles smaller than 6 millimeters in the material to be separated causes no substantial difficulties in conducting the process.

DETAILED DESCRIPTION OF THE INVENTION

The invention relates particularly to a process for recovering materials from wrecked automobiles, appliances and like scrap materials. If required, the scrap material is reduced to a smaller particle size by flattening or pressing, and shredded or ground. Then the shredded scrap is normally subjected to a ferromagnetic separation in which the ferrous-containing materials are removed and separated from the scrap. The non-ferromagnetic portion of the scrap, which conains metals and non-metals, is usually sieved. The material obtained is separted by specific gravity with the use of an aqueous separating medium and at least one hydrocyclone in a first fraction, consisting primarily of metals, and a second fraction which consists primarily of non-metals. According to the present invention using a hydrocyclone and water as separating medium a first fraction is discharged with water at the tip or apex of the cyclone and a second fraction is discharged, also containing water, at the overflow portion of the cyclone. The two separated fractions are de-watered and the solid materials are then removed and used. Mostly, the non-metallic components are destroyed, such as by burning or the like. The metals that are separated may be the subject of further separating procedures such as to remove the copper, aluminium and zinc values therefrom.

In order to remove the water from the various portions of the separated materials, particularly with respect to the portion which is discharged at the overflow of the cyclone, a sieve bend may be used. That is, the overflow portion is directed onto an arcuate sieve and the solid portions thereof are retained on the sieve while the aqueous portion is separated and optionally re-used as described below. The sieve bend provides a substantially reduced tendency for clogging as compared to other types of water separating devices.

Hydrocyclones are known pieces of equipment although they have not been used in a similar situation for the separation of scrap materials. Typically, the hydrocyclone contains a cone-shaped portion which is preferably adjustable in the axial direction with respect to the cylindrical portion of the hydrocyclone. In this manner, the separation procedure may be selected such that the specific gravities of the two separated components may be varied by adjusting the cone-shaped portion of the hydrocyclone with respect to the cylindrical-shaped portion thereof.

A mixture of water and shredded scrap material is prepared following the separation of the ferromagnetic components and this mixture is fed to the hydrocyclone. Pumping such a mixture has certain difficulties as will be appreciated, so that in a preferred arrangement of an apparatus for carrying out the invention, use is made of gravity to feed the mixture of water and scrap into the cyclone. Preferably a supply vessel is used and it is provided at a level higher than that of the cyclone, with respect to the ground, such that the mixture of water and scrap is fed into the hydrocyclone with sufficient speed in order to accomplish the desired separation. This obviates the need for pumping the mixture of water and scrap. The vessel overflow is provided to maintain a substantially constant water pressure at the feed portion of the cyclone.

Although not shown in detail in the accompanying drawings, as is known in the art, a hydrocyclone provides for a tangential feed of the incoming fluid into the cylindrical portion of the cyclone. This tangential feed causes the contents of the cyclone to rotate in the direction of the feed and, as with the present invention, a certain component of the incoming material is removed at the tip of the cone or apex while the remaining portion of the contents in the cyclone is removed from the overflow area, the difference in materials being separated at different portions varying directly with respect to the specific gravity of the materials involved.

According to the invention, the water used during the processing of the scrap material is partially or completely recycled and the fine components accumulating in the processing water due particularly to such a recirculation are removed from at least part of the recirculation of water by an additional cyclone separator or separators.

The invention includes not only a process for separating the metals from the non-metals of scrap material, but also an apparatus for realizing such a process.

The present invention also provides the necessary mechanical plant for carrying out the process according to the invention. The installation usually is equipped with means for reducing in size and shredding or grinding products composed of metals and non-metals and with a magnetic separator for separating off ferromagnetic components from the scrap obtained. According to the present invention the installation is characterized by at least one hydrocyclone, which is provided with a supply vessel with an overflow. Scrap is fed to the supply vessel together with sufficient water. Preferably, the supply vessel is installed at a level higher than that of the hydrocyclone such that the mixture of water and scrap is supplied to the cyclone with sufficient speed. A first de-watering sieve is provided for de-watering the first fraction discharged at the tip or apex of the hydrocyclone, and a second de-watering sieve is provided for de-watering the second fraction discharged at the over-flow of the hydrocyclone.

This invention is particularly adapted for treating scrapped automobiles and in the illustrated embodiment means are provided for reducing the cars to a smaller size by flattening or pressing, and a shredder for grinding the cars, and a magnetic separator for separating ferromagnetic components from the resulting scrap. Such types of apparatus are already well known in the scrap processing industry. At least one hydrocyclone is used which is equipped with a supply vessel having an overflow to which scrap, from which the ferromagnetic components have been separated by means of the magnetic separator, and water are directed. The supply vessel is installed at a level higher than that of the hydrocyclone such that the suspension of water and scrap can be supplied to the cyclone with sufficient speed to accomplish the separation. Appropriate de-watering sieves are provided as described above.

By preference, at least the second dewatering sieve is a sieve bend. The cone-shaped part of the hydrocyclone is preferably adjustable in an axial direction, relative to the cylindrical part. Further, preferably there are means for recirculating the process water wholly or partly, in which, if desired, at least one cyclone separator (thickener) is provided to which at least part of the recirculating water may be fed in order to extract fine solids from the circulating water that may accumulate during continuous operation of the process.

The invention will be further described and illustrated by means of the drawing, in which an embodiment according to the invention is shown schematically as an example.

A scrap automobile 1 is flattened between two opposed rollers 2 and 3 to a bundle or bale 4 in such a way that the car's engine block for the most part passes through the rollers without deformation. Bundle 4 is delivered to a shredder 5 and ground therein. The resulting shredded scrap is carried by conveyor belt 6 under magnetic separator 7, which separates the ferromagnetic components from the scrap. The ferromagnetic components discharged via chute 8 consist principally of ferroalloys and may be used as raw material in the fabrication of steel or in other known procedures.

The non-ferrous metals, plastics, debris and the like that remain are sieved off on sieve 9. Parts which are too coarse for further processing — for instance if larger than 50 mm — are returned to shredder 5 by means of conveyor 10. The portion of particulate scrap passing through sieve 9 is sent to a supply vessel 11; water is supplied to this vessel through line 12 as required. The resulting suspension of solids and water is carried by line 13 to the hydrocyclone 14. The supply vessel 11 is installed at a level which is sufficiently higher than that of the hydrocyclone 14 that the scrap/water mixture enters the cyclone by way of the tangential feed 15 with sufficient speed to effect the desired separation. In this manner the use of a pump to achieve the desired velocity is not required.

In the hydrocyclone 14 separation is effected between specifically heavier and specifically lighter pars. The specifically heavier parts, comprising primarily metals such as copper- and light metal alloys, leave the cyclone through the discharge opening at the tip 18 of the cyclone and are dewatered on de-watering sieve 19 and discharged at 20. The specifically lighter parts, for instance plastics, rubber and textile fibres leave the cyclone through overflow tube 21 and are dewatered on a sieve bend 22 and discharged at 23. The water separated off on sieves 19 and 22 is returned to supply vessel 11 with the aid of pump 24 through line 25.

In the illustrated assembly, the supply vessel 11 has an overflow 26 for the purpose of maintaining a constant water pressure at the feed 15 of the cyclone 14. Preferably a supply vessel as described in the Dutch Pat. Specification No. 96,726 or British Pat. Specification No. 893,485 is used. In this case a vertical baffle 27 is installed in the supply vessel 11, which baffle divides the supply vessel into two compartments 28 and 29. Through the aperture 30 the compartment 29 is connected with the compartment 28. Part of the water recirculated via the line 25 is, together with the solids, fed to compartment 28, the remainder of the recirculated water being sent to compartment 29, in such ratio that the downward velocity of the water through the aperture 30 is so large that light materials do not reach overflow 26 which connects with compartment 29.

During operation of the process, fine components will accumulate in the recirculated process water. In order to avoid accumulation of fine particles, part of the recirculating process water is passed through cyclone thickener 31; the purified fraction is returned to the water recirculation system, the thickened fraction being discharged at 32.

Preferably hydrocyclone 14 is of the type in which the cone-shaped part 16 may be adjusted in axial direction relative to cylindrical part 17. This adjustment feature provides for control of the specific gravity of the materials that are separated such that the heavier metallic materials, say of a specific gravity of the order of about 1.7–11 are discharged through opening 18, while the lighter materials of about 0.8–1.7 are collected from overflow 21.

EXAMPLE

A metal separation/recovery process according to the invention was performed in a semi-technical installation corresponding to the arrangement as illustrated in the drawing. The diameter of the cyclone 14 was 600 mm; the top angle of the conical part was 75°. The quantity of water supplied to the cyclone was 200 m³/h; the water used in the cyclone was recirculated in the manner indicated. The cyclone 14 was so designed as to be adjusted to a specific gravity of separation of about 1.7. Three cyclone thickeners 31 in parallel were used, each having a diameter of 220 mm and a top angle of 20°. The total throughput of the three such cyclones 31 was 65 m³/h of liquid. Automobile scrap, free of iron, was screened at 50 mm on screen 9. Material passing through the screen, of which about 10% by weight was smaller than 6 mm, was supplied in a quantity of about 20 tons per hour to the vessel 11, which was located 10 m higher than the cyclone 14. The quantity discharged from cyclone 14 onto the screen 19 at 20, mainly the metallic fraction, amounted to about 14 tons per hour; the quantity of the predominantly non-metallic fraction discharged over the sieve bend 22 at 23 was about 6 tons per hour. The number of particles smaller than 0.5 mm separated off by means of the parallel cyclone thickeners 31 was smaller than the accuracy with which the overflow quantities of the screens were determined. The mainly metallic fraction consisted of copper, light metals — alloys, other alloys and some glass; the non-metallic fraction of plastics, rubber including foams thereof and textile fibres. The metallic fractions was markedly free of contaminating fines.

Other arrangements for carrying out the objects of the present invention and modifications thereof may also be used. For instance, instead of the single hydrocyclone indicated, a cyclone battery comprising several cyclones may be used. This also applies to the cyclone thickener. Also, separation into more than two fractions may be effected by series-connection of various cyclones or cyclone batteries and, thus, separate the fraction drained at outlet 18 into several light metal fractions. Such variations and others of this type are specifically contemplated and accordingly are considered to form part of the essence of this invention.

We claim:
1. A process for recovering usuable materials from particulate scrap materials composed of non-ferromagnetic metals and non-metal components and separating the scrap into a non-metal portion and a non-ferromagnetic metal portion based upon the different respective specific gravities of said portions, the process including:
    1. providing a hydrocyclone which includes a cylindrical portion, an overflow area, a cone-shaped portion having an apex area and a tangential feed means communicated to the cylindrical area;
    2. mixing said particulate scrap including scrap particles less than about 6mm in diameter with water to form a scrap/water mixture;
    3. injecting the scrap/water mixture through the tangential feed means into the cylindrical portion of the hydrocyclone;
    4. adjusting the cone portion of the hydrocyclone in an axial direction with respect to the cylindrical portion to selectively separate the scrap/water mixture into two portions each having different specific gravities,
        a. discharging the heavier, predominantly metal-containing portion of the mixture from the apex area, and
        b. discharging the lighter, predominantly non-metal containing portion of the mixture from the overflow area of the hydrocyclone, and thereafter
    5. removing water from each of the thus separated metallic and non-metallic portions.

2. The process according to claim 1 wherein the water and scrap are first mixed together in a vessel which is positioned higher than that of the hydrocyclone with respect to the surface of the earth, such that the mixture of scrap and water is delivered with the aid of gravity directly to the hydrocyclone at a velocity sufficient to accomplish the separation of the non-metal components from the metal components.

3. The process according to claim 1 in which the water is removed from the separated non-metal portion issuing from the hydrocyclone by passing same over an arcuate sieve bend.

4. The process according to claim 1 wherein the water, after removal of the solid particles therefrom, is recycled and mixed with additional incoming particulate scrap.

5. A process for recovering usable materials from particulate automobile and household waste scrap material composed of non-ferromagnetic metals and non-metal components and separating the scrap into a non-metal portion and a non-ferromagnetic metal portion based upon the different respective specific gravities of said portions, the process including:

1. providing a hydrocyclone which includes a cylindrical portion, an overflow area, a cone-shaped portion having an apex area and a tangential feed means communicated to the cylindrical area;
2. mixing said particulate scrap including scrap particles less than about 6 mm in diameter with water in a vessel positioned higher than that of the hydrocyclone to form a scrap/water mixture;
3. delivering the scrap-water mixture with the aid of gravity to the hydrocyclone through the tangential feed means into the cylindrical portion of the hydrocyclone at a velocity sufficient to accomplish the separation of the non-metal components from the metal components;
4. adjusting the cone portion of the hydrocyclone in an axial direction with respect to the cylindrical portion to selectively separate the scrap/water mixture into two portions each having different specific gravities, and
   a. discharging the heavier, predominantly metal-containing portion of the mixture from the apex area removing water from the thus separated predominantly metal-containing portion, and
   b. discharging the lighter, predominantly non-metal containing portion of the mixture from the overflow area of the hydrocyclone, and passing the mixture over an arcuate sieve bend thereby removing water from the thus separated non-metallic portion.

6. The process according to claim 5 wherein solid particles contained in the recovered water are concentrated and removed, and the water is mixed with additional incoming scrap in step (2).

7. The process according to claim 5 wherein the water and scrap are first mixed together in a vessel which is positioned higher than that of the hydrocyclone with respect to the surface of the earth, such that the mixture of scrap and water is delivered with the aid of gravity directly to the hydrocyclone at a velocity sufficient to accomplish the separation of the non-metal components from the metal components.

8. The process according to claim 5 wherein the water, after removal of the solid particles therefrom, is recycled and mixed with additional incoming particulate scrap.

* * * * *